United States Patent Office 3,201,474
Patented Aug. 17, 1965

3,201,474
PROCESS OF MANUFACTURING DIALKYL KETENES
Robert H. Hasek and Edward U. Elam, Kingsport, Tenn., assignors to Eastman Kodak Company, Rochester, N.Y., a corporation of New Jersey
No Drawing. Filed Sept. 24, 1959, Ser. No. 841,961
7 Claims. (Cl. 260—585.5)

This invention relates to a process of preparing dialkylketenes. Theoretically, ketenes are anhydrides of carboxylic acids, derived by the abstraction of one molecule of water from each molecule of acid. Ketene itself, $CH_2{:}C{:}O$, the lowest member of the series, has been produced by a variety of methods; in general it can be produced by the pyrolysis of any compound which contains the group $CH_3CO{-}$. Ketene is produced on a commercial scale by pyrolysis of acetone and of acetic acid, with the bulk of the production based on the latter compound. The application of these methods to the production of higher homologs of ketene, however, has not been universally successful. No generalization can be made, as indicated above for ketene, that pyrolysis of compounds containing $RCH_2CO{-}$ or $R_2CHCO{-}$ groups produces monoalkylketenes $RCH{:}C{:}O$ (aldoketenes) or dialkylketenes $R_2C{:}C{:}O$ (ketoketenes). Whereas ketene itself is produced commercially on a very large scale, such production of higher ketenes is unknown. Lack of a practical commercial synthesis nullifies the utility of certain keto-ketenes in the synthesis of products of known commercial value. This utility is based on the distinctive and exceptional behavior of keto-ketenes compared to reactions of aldo-ketenes, particularly of ketene itself. Two points of difference may be illustrated by the use of keto-ketenes for production of glycols, hydroxy acids, and amino acids, all of which are intermediates for the preparation of condensation polymers of very high molecular weight, and are therefore intermediates for valuable plastics, films, and fibers.

(1) The dimers of keto-ketenes are completely alkylated 1,3-cyclobutanediones, which can be hydrogenated to the corresponding 2,2,4,4-tetraalkylcyclobutane-1,3-diols:

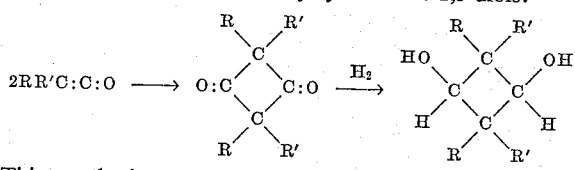

This synthesis of the tetraalkylcyclobutanediols is described in our copending application Serial No. 728,083, filed April 14, 1958, now U.S. Patent No. 2,936,324. These diols have considerable utility in the preparation of esters and polyesters characterized by very high thermal stability.

(2) The condensation of monomeric dimethylketne with formaldehyde produces pivalolactone. Reaction of pivalolactone with water and ammonia yields hydroxypivalic acid and aminopivalic acid, respectively. The latter compounds are useful intermediates for polyesters and polyamides with fiber- and film-forming properties, as is shown, respectively, in U.S. Patent 2,658,055 of Alderson and U.S. Patent 2,500,317 of Lincoln.

We have found that dialkyl ketenes can be prepared by pyrolysis of the anhydrides of the corresponding dialkylacetic acids. We carry out the pyrolysis of these anhydrides by passing them through a suitable heated reaction zone at temperatures of 400–700° C. Suitable apparatus for this purpose is shown in U.S. Patent 2,541,471 of Hull and Saunders. Depending on the particular anhydride involved, the pyrolysis temperature is adjusted in relation to the residence time (contact time) of the reactant in the heated zone to effect an appreciable dissociation of the anhydride into the dialkylketene and the corresponding dialkylacetic acid. The degree of dissociation, which will be referred to as the conversion, may be substantially complete, but we prefer to operate the process so that only about 10 to 70% of the anhydride is dissociated. Upon emerging from the reaction zone, the product stream is passed through a recovery system designed to effect a rapid separation of the dialkylketene from the dialkylacetic acid and unconverted dialkylacetic anhydride. This recovery system suitably comprises an efficient heat exchanger to condense the dialkylacetic acid and the undissociated anhydride to liquid form, a de-entrainment device to remove particles of these liquefied materials from the remaining gas stream, and a heat exchanger to effect condensation of the dialkylketene. Alternatviely, the last heat exchanger may be eliminated and the gaseous dialkylketene passed directly into a reactor wherein it is allowed to react with a reagent, for example with formaldehyde to produce an alpha,alpha-dialkyl-beta-propiolactone.

Anhydrides which may be utilized in carrying out this invention are those of dialkylacetic acids of the formula $RR'CHCOOH$, where R and R' are lower alkyl groups. Suitable anhydrides include isobutyric anhydride, 2-methyl-butyric anhydride, 2-ethylbutyric anhydride, and 2-ethyl-hexanoic anhydride. These anhydrides are dissociated according to the equation

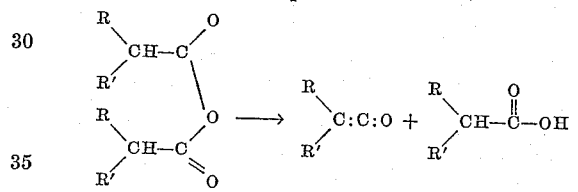

The reaction temperatures used in carrying out this invention are suitably between 400° and 700° C., and preferably between 500 and 600° C. At lower temperatures, the conversion is impractically low even with extended residence times, and at higher temperatures an appreciable degree of decomposition of the desired dialkylketene occurs, with the production of uncondensable gases. The optimum residence or contact time in the pyrolysis zone depends on the temperatures obtained in the zone; this contact time suitably falls within the range of 0.1 to 10 seconds.

The following examples describe typical operations for the practice of this invention.

EXAMPLE 1

Isobutyric anhydride was passed under a slow stream of nitrogen into a preheater consisting of a glass tube, heated by an electric current of 300 watts, 16 mm. in diameter x 76 cm. long. The vaporized anhydride was conducted to a Vycor glass tube, 15 mm. in diameter x 46 cm. long, heated electrically with Nichrome alloy ribbon (1100 watts). Temperatures were measaured in a thermowell which extended through the entire length of the Vycor pyrolysis chamber. Gaseous products from the pyrolysis chamber passed through an efficient water-jacketed copper condenser, and thence through two glass cyclone separators. The residual vapors were then passed through a trap held at 50° C., and conducted to a cold condenser and receiver to collect the dimethylketene (B.P. 34° C.).

With the pyrolysis tube at 500–525° C., and a nitrogen stream flowing at the rate of 1.5 cu. ft. per hour, isobutyric anhydride was passed through the system at the rate of 2400 ml. per hour. During a period of 45 minutes, 1710 g. of anhydride was introduced and 144 g. of dimethylketene was collected, corresponding to a conversion of 19%. The mixture of isobutyric acid and anhydride collected from the separation system contained 1166 g. of isobutyric anhydride. On the basis of 544 g. of anhydride consumed, the yield of dimethyl ketene was 60%.

Experiments were conducted at different pyrolysis temperatures and contact times. The results are listed in Table I.

*Table I.—Pyrolysis of isobutyric anhydride to dimethylketene*

| Pyrolysis Temp., °C. | Anhydride Feed, liters/hr. | Contact Time, sec. | Dimethylketene | |
|---|---|---|---|---|
| | | | Conversion, percent | Yield, percent |
| 500-525 | 2.4 | 0.2 | 19 | 60 |
| 550-600 | 2.58 | 0.16 | 18 | 77 |
| 600 | 1.05 | 0.35 | 9.6 | 54 |

EXAMPLE 2

A type 316 stainless steel tube, .915 in. inside diameter x 40.75 in. long, was used as preheater and pyrolysis chamber. The preheating section of the tube, 12 in. long, contained a core wound with a spiral of Nichrome wire to produce a narrow and extended annular passage. This section and the rest of the tube were heated by three separately controlled electric furnaces. Temperatures, measured in a thermowell which extended the entire length of the tube, were adjusted by control of the furnaces. The first furnace was adjusted to produce a temperature of 250° C. in the vapors issuing from the preheating section; the second furnace was adjusted to raise the vapors to about 450° C. The last furnace was controlled through the thermocouple at the end of the pyrolysis tube, to maintain a pyrolysis temperature of 600° C. The products were recovered by the system described in Example 1.

Under a nitrogen stream of 1.5 cu. ft. per hour, a total of 14,546 g. of isobutyric anhydride was passed through the system at 2240 g. per hour. The dimethylketene obtained amounted to 1197 g. (18.6% conversion). The yield of dimethylketene, based on isobutyric anhydride consumed in the reaction, was 68%. Another experiment in which the pyrolysis temperature was reduced to 500° C., but the conditions were otherwise the same, gave dimethylketene in 90% yield at 9.3% conversion.

EXAMPLE 3

2-methylbutyric anhydride was passed through the apparatus described in Example 1, modified to provide heating of the cyclone separators and direct condensation of the vapors issuing from them (the intermediate trap was not used). The nitrogen flow was increased to remove the less volatile methylethylketene from the separation system at a rates comparable to those achieved with dimethylketene. A total of 3649 g. of 2-methylbutyric anhydride was passed through the system, and 186 g. of crude methylethylketene was collected.

EXAMPLE 4

The pyrolysis tube described in Example 2 was used. The condensation system was modified, and consisted of a copper condenser followed by two jacketed cyclone separators. The condenser and cyclones were maintained at 85–90° C. by circulation of hot water through the jackets. Residual gaseous products were conducted from the last cyclone directly to a receiver under a Dry Ice trap.

A slow stream of nitrogen was passed through the system as 5119 g. of 2-ethylbutyric anhydride was added over a period of 2.5 hours. The first section of the pyrolysis tube was held at 250–300° C., the second section at 450–500° C., and the third section at 600° C. A total of 372 g. of diethylketene was recovered in the final receiver (16% conversion). The mixture of acid and anhydride recovered from the separators contained 3830 g. of 2-ethylbutyric anhydride; on the basis of anhydride consumed (1289 g.), the yield of diethylketene was 64%.

EXAMPLE 5

Isobutyric anhydride was metered from a reservoir through a flowmeter into the pyrolysis tube. The pyrolysis tube, heated by two electric furnaces, was equipped with a core designed to direct the anhydride through a long spiral preheating path and then through an annular cracking zone. The hot vapors were quenched in the lower section of the tube, which was designed for rapid and efficient cooling, and the mixture of vapor and liquid was conducted into a separator, where isobutyric acid and unconverted anhydride were removed and collected in a tank. The dimethylketene vapor was compressed and passed into the condensing and receiving system described in Example 1. The entire system was blanketed with nitrogen from a source directed into the anhydride reservoir, the collection tank, and the separator; off-gas from the apparatus was scrubbed in a trap to remove traces of dimethylketene. Temperatures of coolants supplied to the lower pat of the pyrolysis tube, the separator, and the final condensing system were regulated independently to provide the best separation of dimethylketene from by-products. The compressor was heated to prevent condensation and excessive loss of dimethylketene in the compressor lubricant.

In operation, isobutyric anhydride was preheated in the pyrolysis tube to 450–500° C., and subjected to cracking temperatures up to 575–600° C. in the central section. The quenched product issued from the pyrolysis tube at 60–70° C. and dimethylketene was separated and compressed at 50° C. The monomeric dimethylketene was condensed and collected in the receiver, where it was allowed to dimerize to the crystalline tetramethyl-1,3-cyclobutanedione.

Results of several experiments are listed in Table II.

*Table II.—Pyrolysis of isobutyric anhydride to dimethylketene*

| Pressure, mm. | Contact Time, sec. | Dimethylketene | |
|---|---|---|---|
| | | Conversion, percent | Yield, percent |
| 735 | .60 | 11 | 72 |
| 120 | .14 | 46 | 75 |
| 100 | .26 | 57 | 87 |
| 100 | .27 | 64 | 77 |

EXAMPLE 6

Methylethylketene was prepared from 2-methylbutyric anhydride in the equipment described in Example 5. A total of 4676 g. of 98% 2-methylbutyric anhydride was pyrolyzed in 5 hours, under a system pressure of 25 mm., with a cracking zone temperature of 580–600° C. The ethylmethylketene amounted to 1149 g., with a recovery of 1964 g. of 2-methylbutyric acid and 1432 g. of unchanged anhydride. The yield of methylethylketene thus was 81% (56% conversion).

EXAMPLE 7

The pyrolysis of 3887 g. of 2-ethylhexanoic anhydride (96% pure) in the equipment described in Example 5 was carried out in 7 hours at a system pressure of 5 mm. and a pyrolysis zone temperature of 600–625° C. The butylethylketene, which was recovered in a cold trap in the low pressure system (rather than being compressed to atmospheric pressure), weighed 920 g. (54% conversion). The mixture of 2-ethylhexanoic acid and unconverted anhydride weighed 2894 g. and contained 45% acid and 55% anhydride; the yield of butylethylketene was therefore 92% of theoretical.

We did not find the process operative with the anhydrides of straight-chain acids. The pyrolysis tube described in Example 2, with the unmodified condensing system described in Example 1, was used for the attempted pyrolysis of propionic anhydride. The copper condenser was cooled with chilled water, the cyclone separators were unjacketed, and the trap was held at room temperature but equipped with condensers cooled by chilled water. Residual gases from this system were led to a receiver under a dry ice trap. Approximately 6300 g. of propionic anhydride was passed through the system over a period of 3.5 hours. At thirty-minute intervals, the temperature in the final section of the pyrolysis tube was changed; temperatures of 450°, 500°, 550°, 600°, 650, and 675° C. were used successively. Only about 1 ml. of liquid was recovered in the final trap, and this could not be identified as methylketene. Changes in the flow of nitrogen during the experiment had no effect on the results obtained.

The pyrolysis furnace and recovery system described in the preceding paragraph were used for the attempted pyrolysis of n-butyric anhydride. Approximately 3050 g. of n-butyric anhydride was passed through the system at maximum temperatures ranging from 450° to 700° C. No liquid product was collected in the receiver at any time.

We claim:
1. A process of manufacturing a dialkyl ketene having the formula

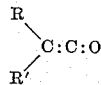

which comprises subjecting to non-catalytic pyrolysis a dialkylacetic acid anhydride having the formula

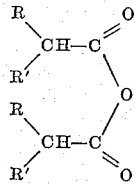

R and R′ being lower alkyl groups, at a temperature within the range of 400°–700° C.

2. A process of manufacturing dimethyl ketene which comprises subjecting isobutyric anhydride to non-catalytic pyrolysis at a temperature within the range of 400°–700° C.

3. A process of manufacturing methylethylketene which comprises subjecting 2-methylbutyric anhydride to non-catalytic pyrolysis at a temperature within the range of 400°–700° C.

4. A process of manufacturing diethyl ketene which comprises subjecting 2-ethylbutyric anhydride to non-catalytic pyrolysis at a temperature within the range of 400°–700° C.

5. A process of manufacturing butylethyl ketene which comprises subjecting 2-ethylhexanoic anhydride to non-catalytic pyrolysis at a temperature within the range of 400°–700° C.

6. A process of manufacturing a dialkylketene of the formula,

which comprises subjecting to non-catalytic pyrolysis a dialkyl acetic acid anhydride of the formula,

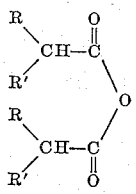

R and R′ being lower alkyl groups, at a temperature from 500° C. to 600° C. and forming said dialkylketene and a dialkyl acetic acid of the formula, RR′CHCOOH.

7. A process of manufacturing dimethylketene which comprises subjecting isobutyric anhydride to non-catalytic pyrolysis at a temperature from 500° C. to 600° C. and a pressure no greater than 120 mm. mercury and forming said dimethylketene and isobutyric acid.

References Cited by the Examiner

UNITED STATES PATENTS 2,045,739  6/36  Wiezevich _____ 260—585.5

FOREIGN PATENTS 901,236  10/44  France.
848,190  9/52  Germany.
1,044,067  11/58  Germany.
568,184  10/57  Italy.

LORRAINE A. WEINBERGER, *Primary Examiner.*

CHARLES B. PARKER, LEON ZITVER, *Examiners.*